United States Patent
Mühlbach

(10) Patent No.: US 12,444,945 B2
(45) Date of Patent: Oct. 14, 2025

(54) METHOD AND DEVICE FOR POWER CONSUMPTION AND/OR POWER INPUT CONTROL IN AN ELECTRICAL POWER SUPPLY NETWORK

(71) Applicant: SEK-AUTOMOBILTECHNIK GMBH, Rühen (DE)

(72) Inventor: Thomas Mühlbach, Rühen (DE)

(73) Assignee: SEK-AUTOMOBILTECHNIK GMBH, Rühen (DE)

( * ) Notice: Subject to any disclaimer, the term of this patent is extended or adjusted under 35 U.S.C. 154(b) by 450 days.

(21) Appl. No.: 17/909,738

(22) PCT Filed: Apr. 16, 2021

(86) PCT No.: PCT/EP2021/059975
§ 371 (c)(1),
(2) Date: Sep. 6, 2022

(87) PCT Pub. No.: WO2021/213937
PCT Pub. Date: Oct. 28, 2021

(65) Prior Publication Data
US 2023/0106367 A1  Apr. 6, 2023

(30) Foreign Application Priority Data

Apr. 20, 2020 (DE) .......................... 102020110649.1

(51) Int. Cl.
*H02J 3/14* (2006.01)
*H02J 3/00* (2006.01)

(52) U.S. Cl.
CPC .............. *H02J 3/144* (2020.01); *H02J 3/003* (2020.01)

(58) Field of Classification Search
CPC .......... H02J 3/14; H02J 2310/14; H02J 3/381; H02J 2310/12; H02J 13/00004;
(Continued)

(56) References Cited

U.S. PATENT DOCUMENTS 6,181,985 B1 *  1/2001  O'Donnell ........ H02J 13/00007
                                                     700/291
9,760,956 B2     9/2017  Magnussen et al.
(Continued)

FOREIGN PATENT DOCUMENTS

CA      2753678 A1 *  9/2010  ............. G05B 19/02
CA      2753809 A1 *  3/2013  ............. G05B 15/02
(Continued)

OTHER PUBLICATIONS

Notification Concerning Transmittal of International Preliminary Report on Patentability (Chapter I of the Patent Cooperation Treaty), in English, dated Nov. 3, 2022, which was issued by the International Bureau of WIPO in Applicant's corresponding international PCT application having Serial No. PCT/EP2021/059975, filed on Apr. 16, 2021.

(Continued)

*Primary Examiner* — Santosh R Poudel
(74) *Attorney, Agent, or Firm* — Bodner & Bodner, PLLC; Christian P. Bodner; Gerald T. Bodner

(57) ABSTRACT

The invention relates to a method for power consumption and power input control in an electrical power supply network, wherein a control signal with an item of tariff information is generated by a signal station at a power supply and unidirectionally output via the power supply network, wherein the control signal is received by at least one receiving unit arranged in the power consumption network and the control signal received by the receiving unit is used for operation control of a power output unit/power input unit for a downstream power consumer/power generator. A device for power consumption/power generation control comprises a receiving unit for a control signal transmitted via a power supply network with means for converting the control signal and for generating switching processes for (Continued)

Figure 1:
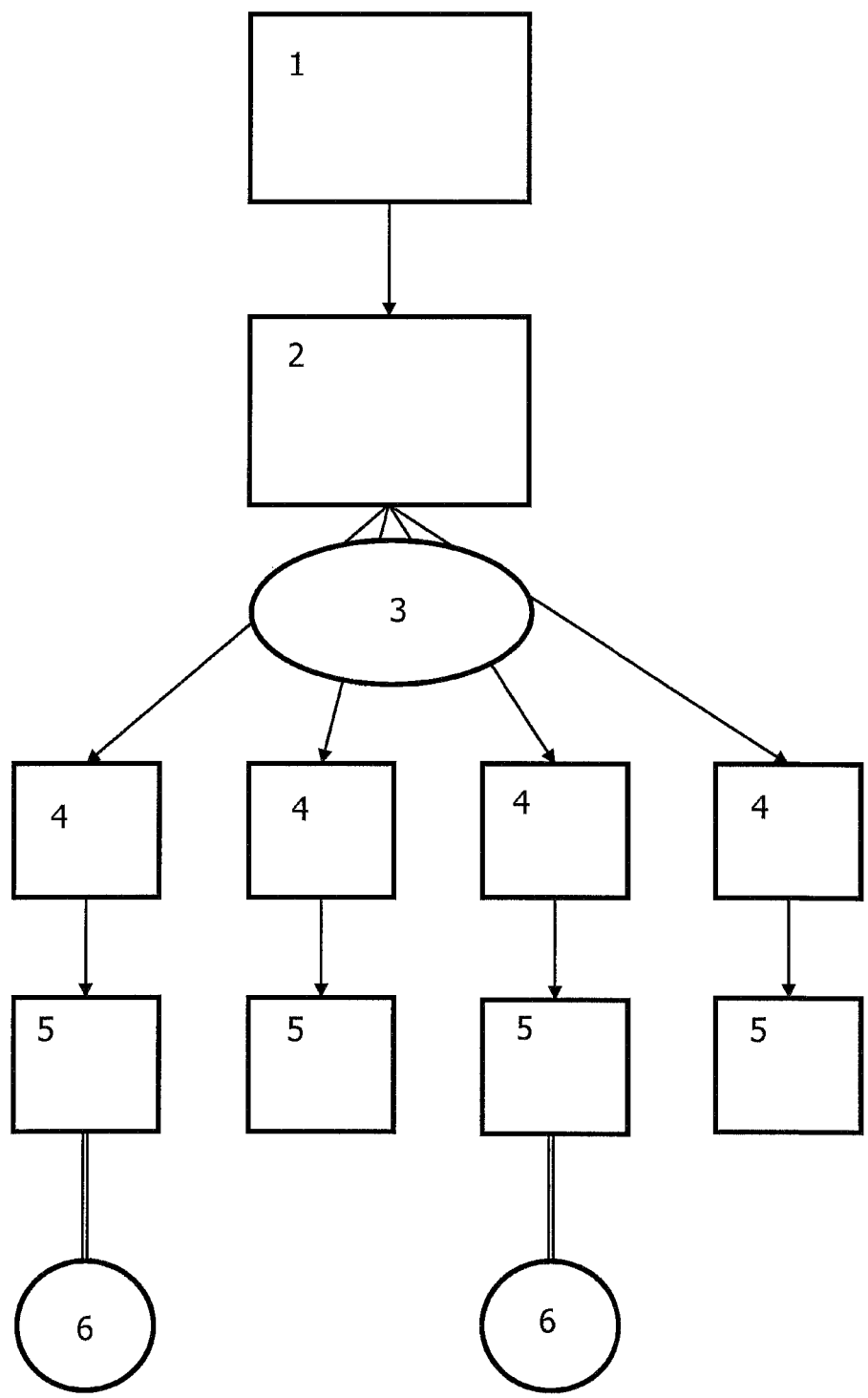

a power output/power input unit controlled by the receiving unit for connecting a downstream consumer/generator.

18 Claims, 12 Drawing Sheets

(58) Field of Classification Search
CPC ...... H02J 2300/24; H02J 2310/60; H02J 3/32; H02J 13/00006; H02J 13/00022; H02J 13/00026; H02J 2300/28; H02J 7/35; H02J 13/00002; H02J 2203/20; H02J 2310/64; H02J 3/322; H02J 13/00018; H02J 2300/20; H02J 3/003; H02J 3/38; H02J 9/06; H02J 13/00007; H02J 13/00024; H02J 13/00028; H02J 13/00034; H02J 2203/10; H02J 3/004; H02J 3/0075; H02J 3/16; H02J 7/0068; H02J 1/10; H02J 13/00001; H02J 2300/10; H02J 2310/48; H02J 2310/52; H02J 2310/62; H02J 3/0012; H02J 3/008; H02J 3/241; H02J 3/28; H02J 7/0063; H02J 1/14; H02J 13/00; H02J 13/00009; H02J 13/0001; H02J 13/00017; H02J 2300/26; H02J 2300/40; H02J 2310/10; H02J 2310/40; H02J 3/00; H02J 3/12; H02J 3/26; H02J 3/388; H02J 3/40; H02J 3/466; H02J 3/472; H02J 3/48; H02J 7/00711; H02J 7/34; H02J 9/062; Y04S 20/222; Y04S 20/242; Y04S 40/12; Y04S 20/00; Y04S 50/10; Y04S 10/126; Y04S 20/248; Y04S 40/126; Y04S 40/121; Y04S 50/14; Y04S 10/123; Y04S 10/50; Y04S 10/52; Y04S 20/12; Y04S 30/14; Y02B 70/3225; Y02B 70/30; Y02B 90/20; Y02B 10/10; Y02E 10/56; Y02E 10/76; Y02E 60/00; Y02E 70/30; Y02E 10/72; Y02E 40/50; Y02E 40/70; Y02E 307/23; Y02E 307/24; Y02E 700/295
See application file for complete search history.

(56) References Cited

U.S. PATENT DOCUMENTS

| | | | | |
|---|---|---|---|---|
| 2011/0270452 A1* | 11/2011 | Lu | ............... | G06Q 10/06 340/3.1 |
| 2013/0307340 A1* | 11/2013 | Subramanium | ..... | H02M 1/4258 363/142 |
| 2020/0341529 A1* | 10/2020 | Kaipu Narahari | ..... | G05B 15/02 |
| 2021/0217423 A1* | 7/2021 | Rakshit | ............. | G10L 15/22 |

FOREIGN PATENT DOCUMENTS

| | | | | |
|---|---|---|---|---|
| CA | 2754512 A1 * | 3/2013 | ............ | G06Q 30/02 |
| DE | 1015104 B | 9/1957 | ............ | H02J 13/00 |
| DE | 19732565 C1 | 5/1999 | ............ | H02J 13/00 |
| DE | 102009047794 A1 | 4/2011 | ............ | H02J 3/00 |
| DE | 102012103081 A1 | 10/2012 | ............ | H02J 4/00 |
| DE | 102012020803 A1 | 4/2014 | ............ | H02J 13/00 |
| EP | 0895333 A2 | 2/1999 | ............ | H02J 13/00 |
| EP | 2112640 A1 | 10/2009 | ............ | G08C 17/02 |
| EP | 3091630 A1 | 11/2016 | ............ | H02J 13/00 |
| WO | WO2014016092 A2 | 1/2014 | ............ | H02J 3/14 |

OTHER PUBLICATIONS

English translation of the International Preliminary Report on Patentability (Chapter I of the Patent Cooperation Treaty), dated Oct. 25, 2022, which was issued by the International Bureau of WIPO in Applicant's corresponding international PCT application having Serial No. PCT/EP2021/059975, filed on Apr. 16, 2021.
Written Opinion of the International Searching Authority, in English, dated Jul. 2, 2021, which was issued by the International Bureau of WIPO in Applicant's corresponding international PCT application having Serial No. PCT/EP2021/059975, filed on Apr. 16, 2021.
International Search Report, in English, dated Jul. 2, 2021, which was issued by the International Bureau of WIPO in Applicant's corresponding international PCT application having Serial No. PCT/EP2021/059975, filed on Apr. 16, 2021.
Office Action (in German), dated Nov. 24, 2020, issued by the German Patent Office for Applicant's corresponding German Patent Application No. DE102020110649.1, filed Apr. 20, 2020.

* cited by examiner

METHOD AND DEVICE FOR POWER CONSUMPTION AND/OR POWER INPUT CONTROL IN AN ELECTRICAL POWER SUPPLY NETWORK

The invention relates to a method for power consumption and/or power input control in an electrical power supply network according to claim 1 and to a device for power consumption and/or input control according to claim 13.

At present and in the future an increasing portion of very widely fluctuating parts of regenerative power generation in given power supply networks has to be reckoned with. Under these conditions it becomes ever more necessary to employ a power management tailored to these fluctuations, in which a given power supply and a given consumption are matched to each other. Above all the ever more urgent goal of reducing $CO_2$ emissions and thus reducing the energy portion of fossil power plants in a power supply network requires adaptation and a more optimal use of the highly dynamic supply particularly of regenerative current.

It is obvious that precisely then, when power input into the power supply network is high, consumers must be persuaded to use the current within this time period and in return not use any power during periods of short supply. If at all, consumers are currently, due only to limited options, given various current prices/tariffs, which basically merely distinguish between, for example, night current and day current. These few existing superseded solutions, which were practicable in the past, now have to be revised, extended and adapted to suit momentary and future requirements.

However, a power consumption control in power supply networks, which is based on a large number of possible items of information turns out to be frequently very complex and costly. It would admittedly be possible to employ widely branched networks for power consumption control, in which all terminals interlinked in the power supply network are controlled by means of software programs and matched to each other. The realisation of such power consumption controls is however technically extremely demanding as regards hardware, administration and control, complex and thus also prone to faults. Besides, the components required for this consume themselves a lot of energy, because they need servers and databases, which must process an overwhelming flood of data. Furthermore a balanced prioritisation of the consumer demands is an extremely difficult task in view of the multitude of different devices of individual households. Moreover a network-based and software-controlled management of all consumers is disconcerting from a data protection point of view and an invitation for misuse by unauthorised data users. For these reasons the bidirectional communication between power generator and consumer according to a demand/response principle, which by the way is technically relatively vulnerable, is as shown in many other approaches, disconcerting not only as regards data protection law, but also not practicable.

Therefore the objective developed to propose a method for power management in an electrical power supply network, with which a secure control of the power consumption as well as the integration of the power generation, in particular regenerative power generation, is possible in a simple and much less complex manner. In addition this leads to the objective to propose a device, with which such a control is readily understandable and can be used each and every day by each user in a simple manner.

In addition the following shall be ensured and achieved:

Sufficient supply stability shall be achieved due to low complexity and thus low susceptibility to faults. Increased administrative energy expenditure due to demand-respond data processing shall be avoided.

Any misuse and manipulation due to external intervention (hackers) shall be reliably excluded. Data protection shall be guaranteed. In particular it shall not be possible to draw conclusions as to individual consumer behaviour.

A solution of the switching load problem in case of changing power supply states is desirable. In particular it shall be possible to stabilise the power grid through load transfer, where a shifting of high consumption loads from the state of "power deficiency" to that of "power surplus" is realised.

This shall result in achieving more favourable current prices through a more effective use of green power for a lesser necessity of baseload/reserve power stations, thus saving on $CO_2$ emissions, and in reducing the necessity of purchasing foreign current in "power deficiency phases". A reduction shall be achieved in case of switch-offs/feed-in limitations of regenerative power generators.

The objective is met with a method for power consumption/power input control in an electrical power supply network with the characteristics of claim 1 and with a device for power consumption/power input control with the characteristics of claim 13. The sub-claims contain advantageous and convenient arrangements of the method and/or the device.

According to the invention, with the method for power consumption/power input control in an electrical power supply network a control signal is generated by a signal station at a power supplier and unidirectionally transmitted via the power supply network. The control signal is received by at least one receiving unit arranged in the power supply network. The control signal received by the receiving unit is used for operation control of a power output/power input unit for downstream power consumers/power generators.

The method according to the invention is therefore based on the idea to use the power supply network for signal transfer. Signal transfer comprises information on which tariff is currently linked to the power available in the power supply network. This signal denoted here as control signal serves to control the operation of a power output unit/power input unit, i.e. for example the switching-on and switching-off of socket devices.

This entails a number of advantages: firstly this signal transfer is unidirectional. That means that a return of consumer signals to the power supplier is not possible. The amount of data which would otherwise occur is drastically reduced and data protection for the consumer is fully guaranteed. In addition power consumption/power generation can be controlled on site, at the actual location of the consumer/generator, and in a decentralised manner matching the respective tariff, which the user can configure himself.

In one arrangement the receiving unit comprises a stored ID, wherein the control signal is matched to the ID of the receiving device. This means that individual consumers/generators and/or consumer/generator groups can be selectively addressed by the control signal.

In one arrangement a tariff information output of the current tariff information of the control signal is executed by the receiving unit and/or an external communication device. As a result the user can directly recognise the currently active tariff state.

In one arrangement a switching release of tariff states can be executed by the receiving unit via at least one pre-selection switching unit in dependence of the tariff information contained in the control signal. This causes the receiving unit to generate switching states depending on the tariff information in the control signal. As a result the user can specify himself, in which way the control signal will finally be used for operation control at the location of the power output/power input.

In one advantageous arrangement the receiving unit can also comprise several freely selectable and/or editable operation control programs, wherein a user-specific selection can be executed under predetermined switching states/switching characteristics of the power output/power input unit. The user can for example specify here, when and how the power output/power input unit shall be controlled via the pre-selection switching unit in dependence of the control signal, i.e. which control program shall be used, and which parameters can be taken into account and can be changed.

In one arrangement the control signal contains tariff information, wherein the tariff information is visualised via a display with the pre-selection switching unit being set manually and/or being controlled via the operation control program. At the same time an appropriate control of the power output/power input unit is executed by means of the control signal according to the setting of the pre-selection switching unit.

In one convenient arrangement the control signal contains tariff change information, wherein a manual change of the pre-selection switching unit can be performed by the tariff change information and/or a future operation control of the power output unit calculated in advance can be executed by the operation control program. This means in particular that on the side of the consumer/generator connection it is possible for an operation control to be planned in advance.

In one advantageous arrangement the power output/power input unit contains an information output, wherein the current switching state is visualised—by an LED for example, which indicates that voltage is present.

In one arrangement of the method a switching load distribution is executed in the power supply network by the control signal, wherein the control signal contains a combination of tariff information and transmitting ID. Individual or several receiving devices and/or user units, in particular households, can be selectively controlled by the transmitting ID (9).

Advantageously a switching time distribution in the power supply network is executed via the transmitting ID in the control signal. To this end the control signal contains a specific user ID and, in a further advantageous arrangement, a switching delay portion. The switching delay portion may also be fixedly located in the receiver module. The user ID can be used to selectively control individual or several receiving units and/or receiving device groups and the switching delay portion can be used to execute a chronologically staggered response of individual power output units/power input units and thus a switching load distribution.

In a further advantageous design the control signal and/or the receiving unit comprises a fixed switching delay portion. In this case it is possible, depending on user characteristics, to realise individual user switching delays and/or user switching delay groups. This allows a chronologically staggered response of individual power output units/power input units to be executed, so that this offers a further possibility to realise a switching load distribution in the power supply network.

In one advantageous design the receiving unit comprises an activatable and/or programmable feed control and/or a follow-up control. This allows for example a switch-on procedure and/or switch-off procedure adapted to the tariff change information to be executed at the power output unit. This makes it possible to control in detail the connecting or disconnecting of consumers/generators in dependence of predefined time windows.

In a further arrangement the receiving unit and/or the power output unit executes a signal transfer with an external mobile and/or stationary communication device. This allows a control and/or function capture of the receiving unit and/or the power output unit together with influencing the pre-selection switching unit to be executed by the communication device. Designing the method in this way allows easy access to the pre-selection switching unit and/or the operation control program of the receiving unit, for example via a smartphone or similar device, wherein the operating options of appropriate user programs, so-called apps, can be utilised.

In a further design of the method the control signal contains source information pointing to a power generator and/or a primary power source, wherein the operation control program controls the pre-selection switching unit in dependence of the source information. This makes it possible in particular for the user to select power from a selectively chosen power utility company and/or a certain power source and set this as a default. In addition this allows various primary energy sources and power suppliers to be selectively assigned to individual consumers.

A device for power consumption/power input control contains a receiving unit for a control signal communicated via a power supply network with a transducer of the control signal for generating switching states for a power output unit/power input unit controlled by the pre-selection switching unit for connecting a downstream power consumer/power generator.

In one embodiment the receiving unit and the power output unit are integrated in a common consumption/input control device, wherein the consumption/input control device comprises a plug-in portion for plugging into a socket connection or comparable connection.

In one embodiment the receiving unit and the power output unit are integrated in a common consumption/input control device, wherein the consumption/input control device comprises at least one socket portion for inserting a plug of a consumer to be connected or a comparable connection.

In one embodiment the receiving unit contains one or more operation control programs, which by processing various parameters exerts an influence on the pre-selection switching unit.

In one embodiment the receiving unit and/or the power output unit and/or the consumption/input control device comprises means for a data exchange with an external communication device, wherein the external communication device contains means for influencing the pre-selection switching unit and/or the data processing of the operation control program in the receiving unit and/or the consumption/input control device.

In one arrangement the receiving unit and/or the consumption/input control device comprises means for selecting, setting and/or displaying consumption control parameters, in particular parameters for the pre-selection switching unit and/or an internal operation control program.

The method according to the invention and the device will now be discussed in detail by way of exemplary embodiments.

Identical reference symbols are used for the same or functionally equal components.

In the drawing

Figure 2:
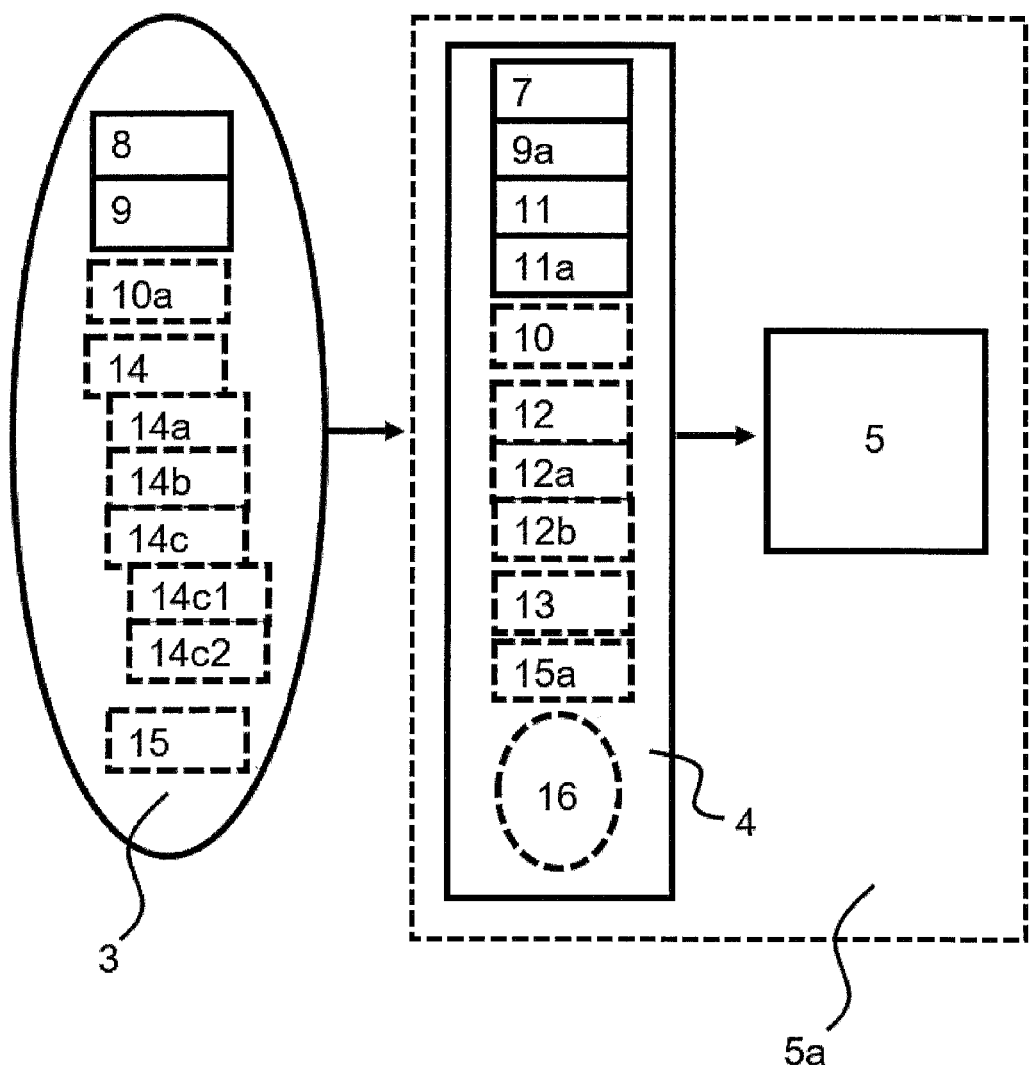
Figure 2A:
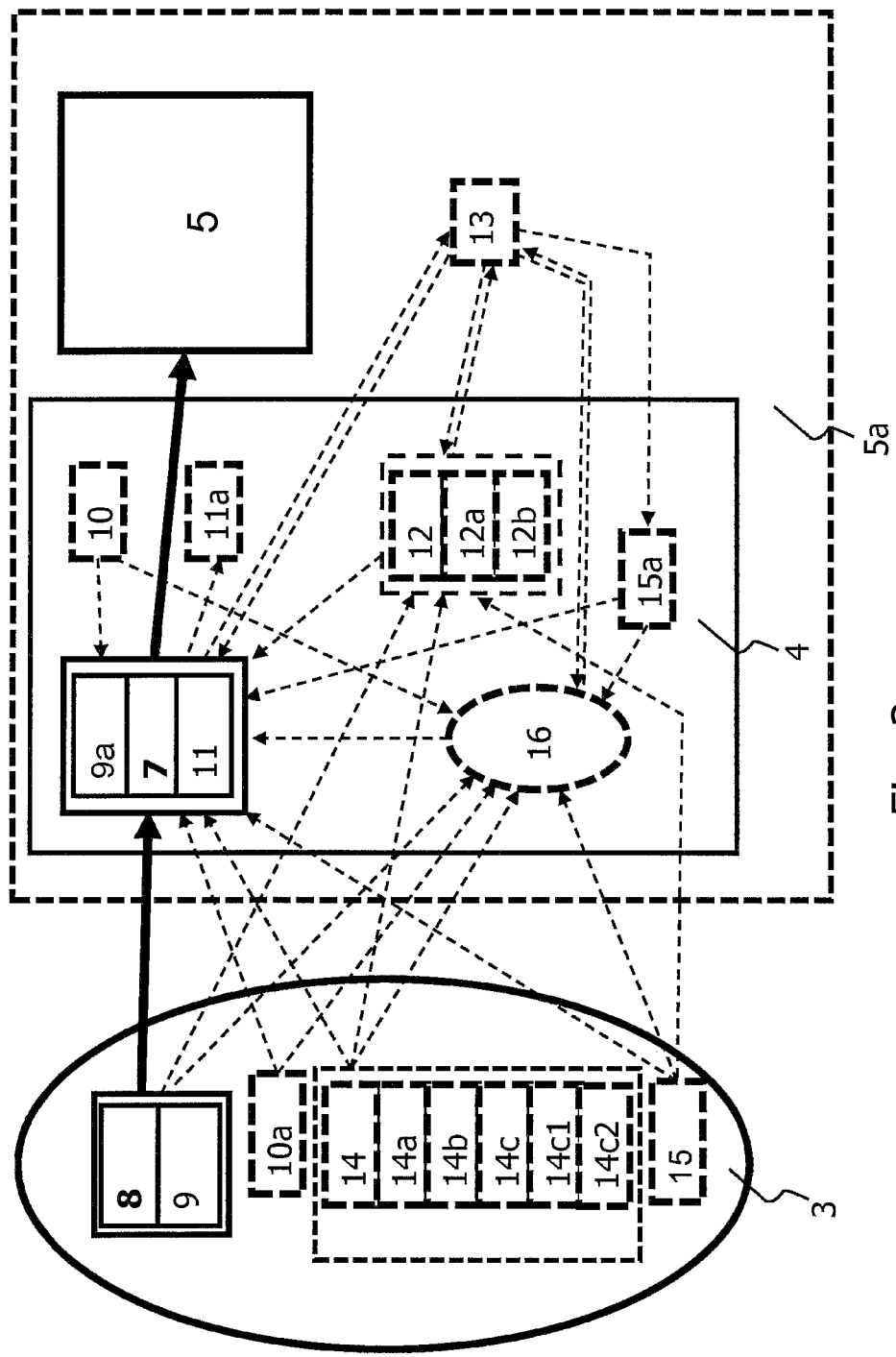
Figure 3:
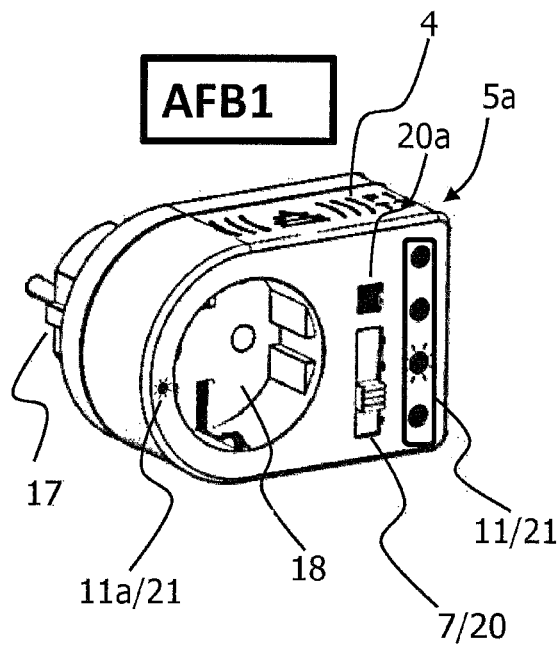
Figure 3:
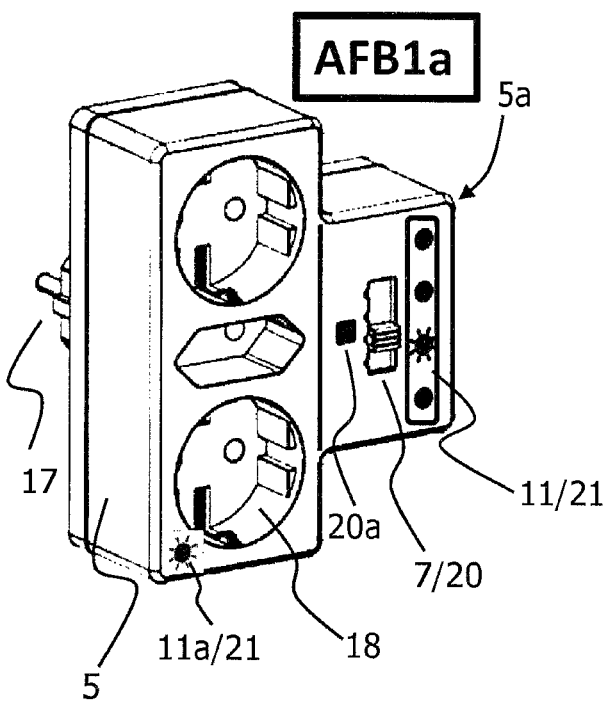
Figure 3A:
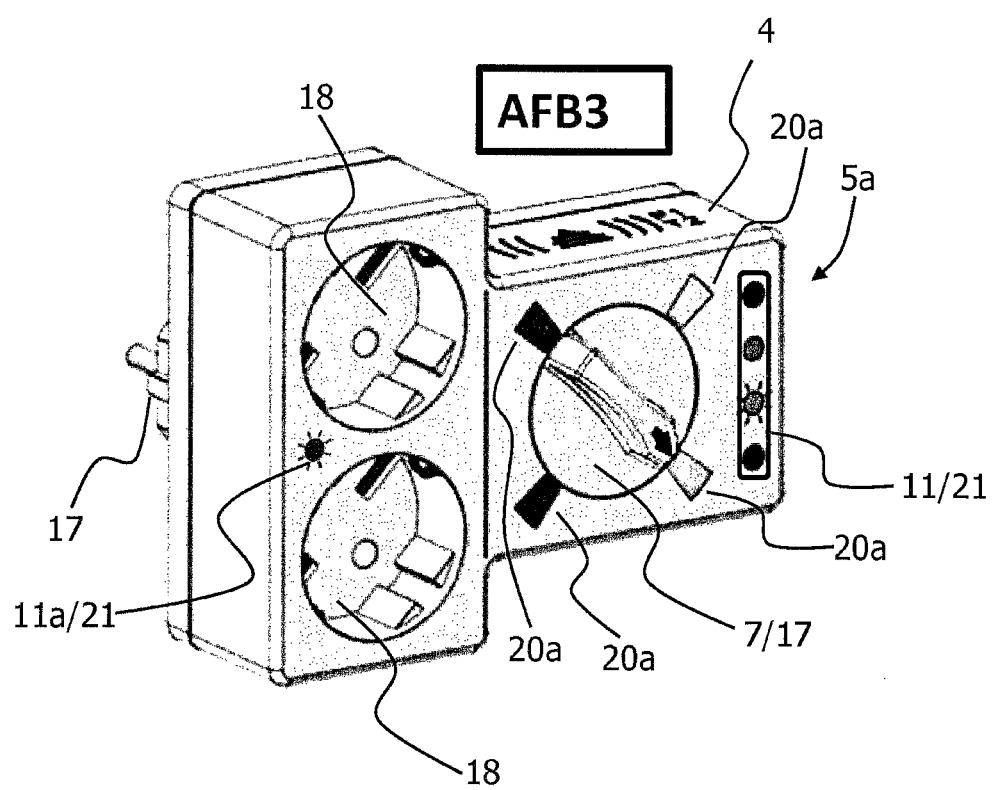
Figure 4:
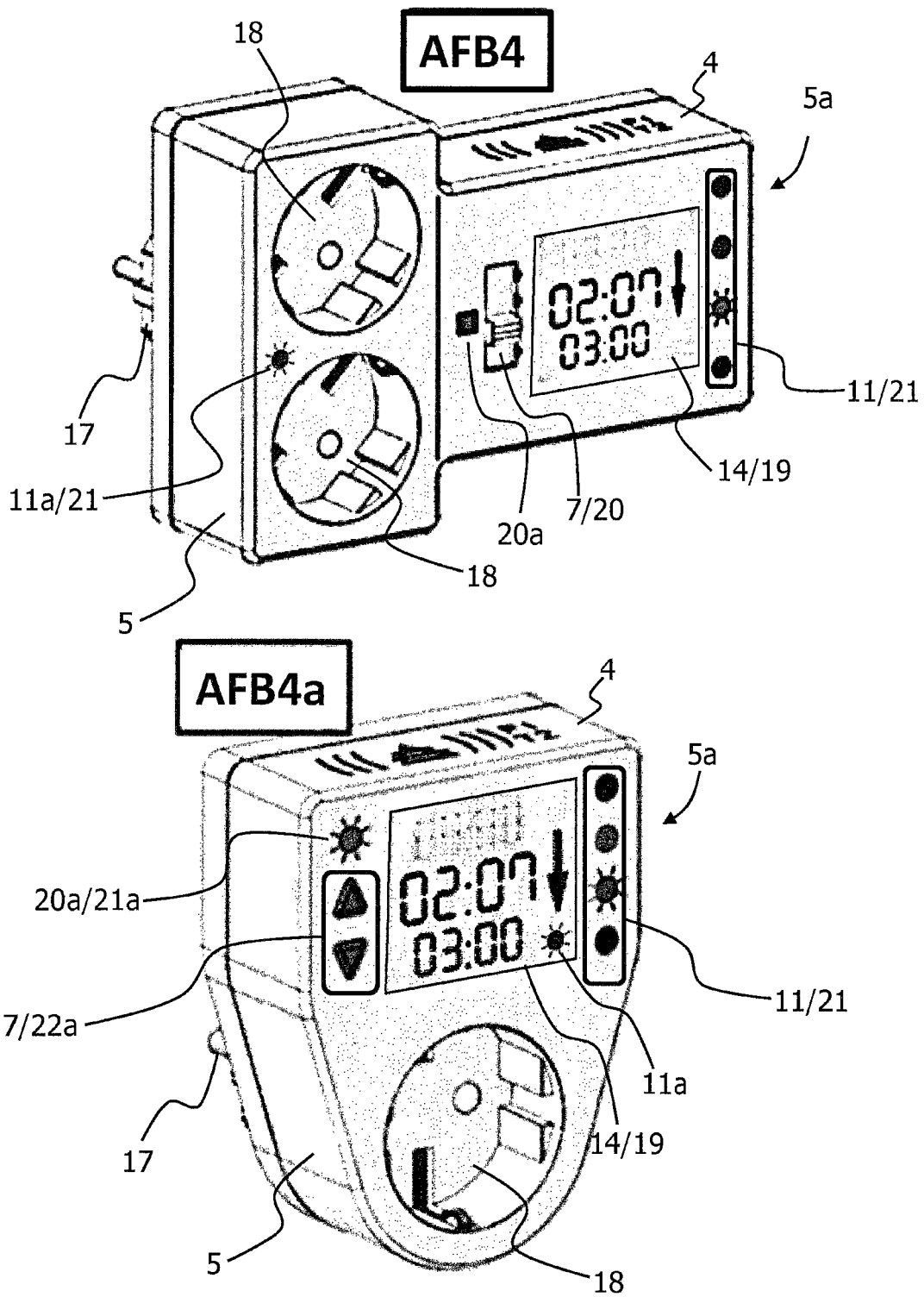
Figure 5:
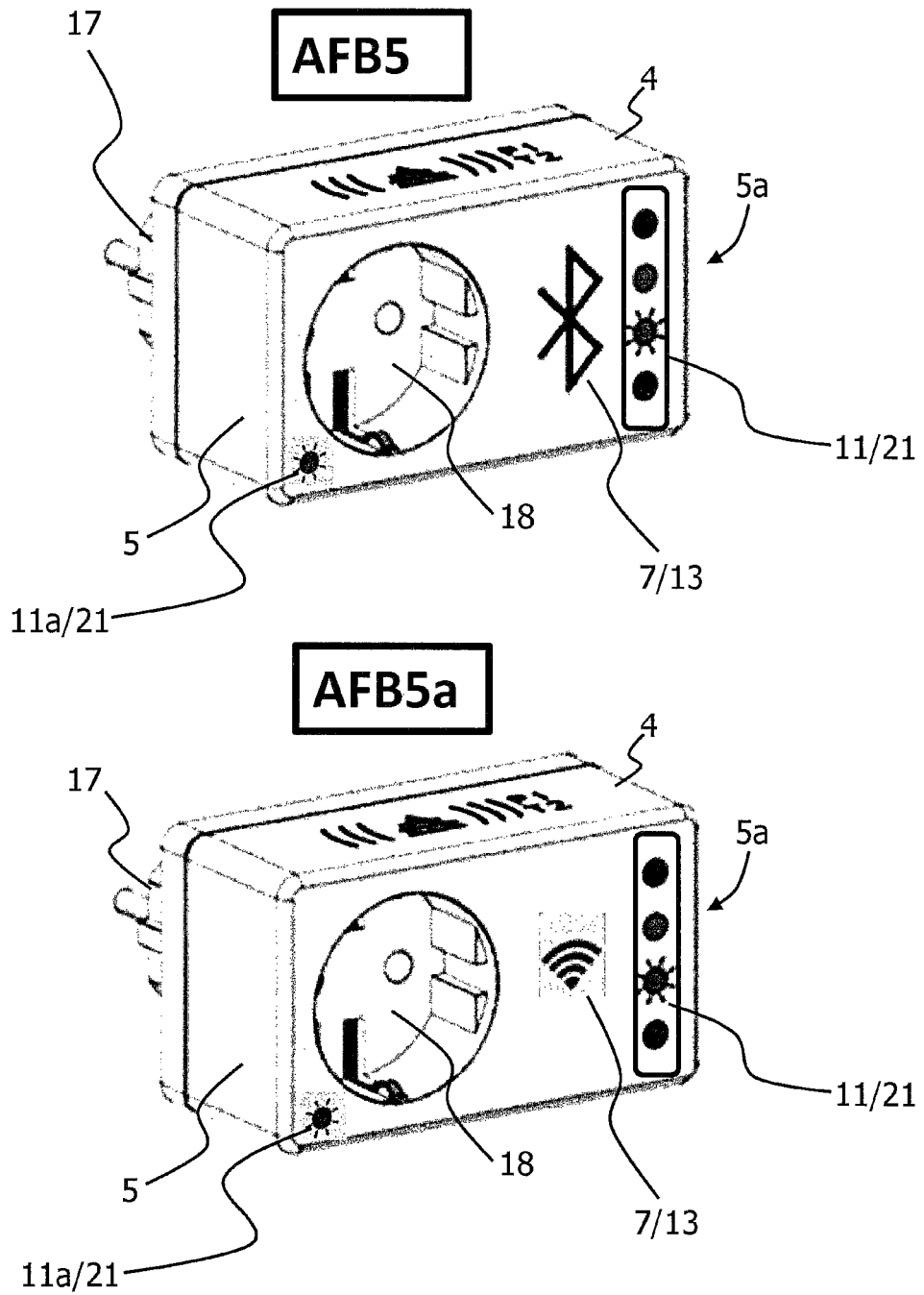
Figure 6:
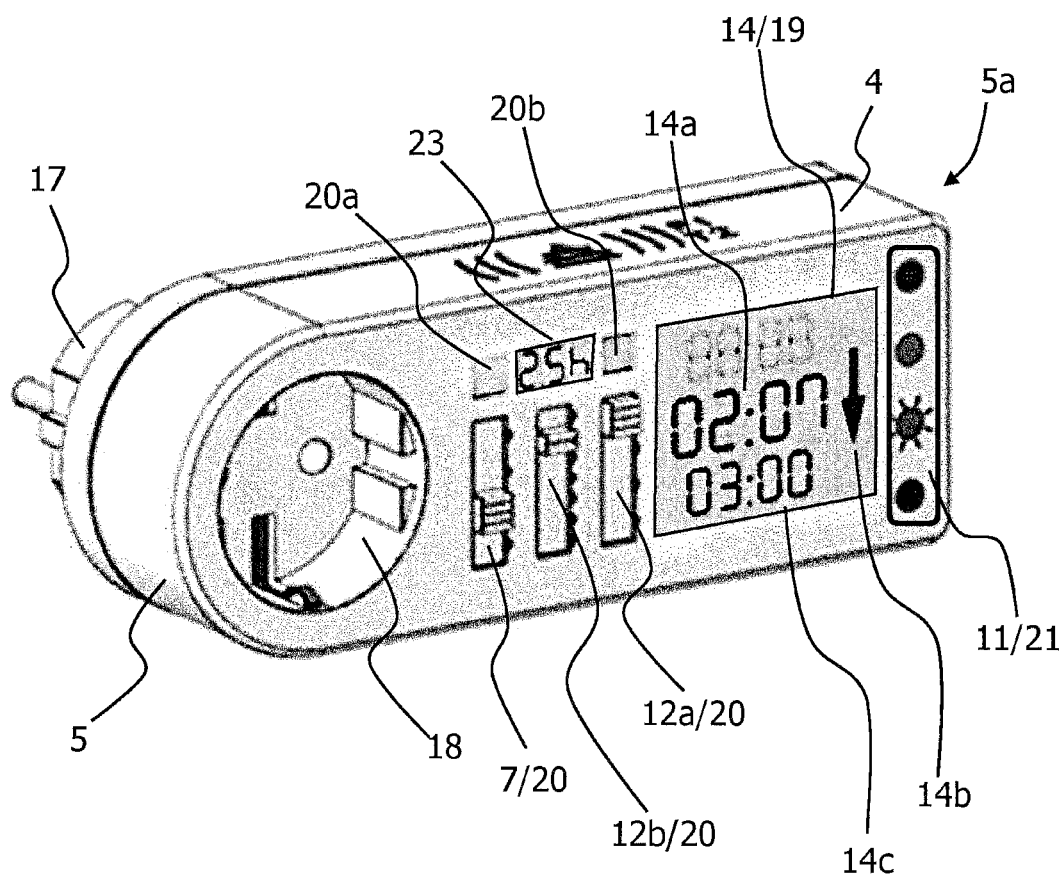
Figure 7:
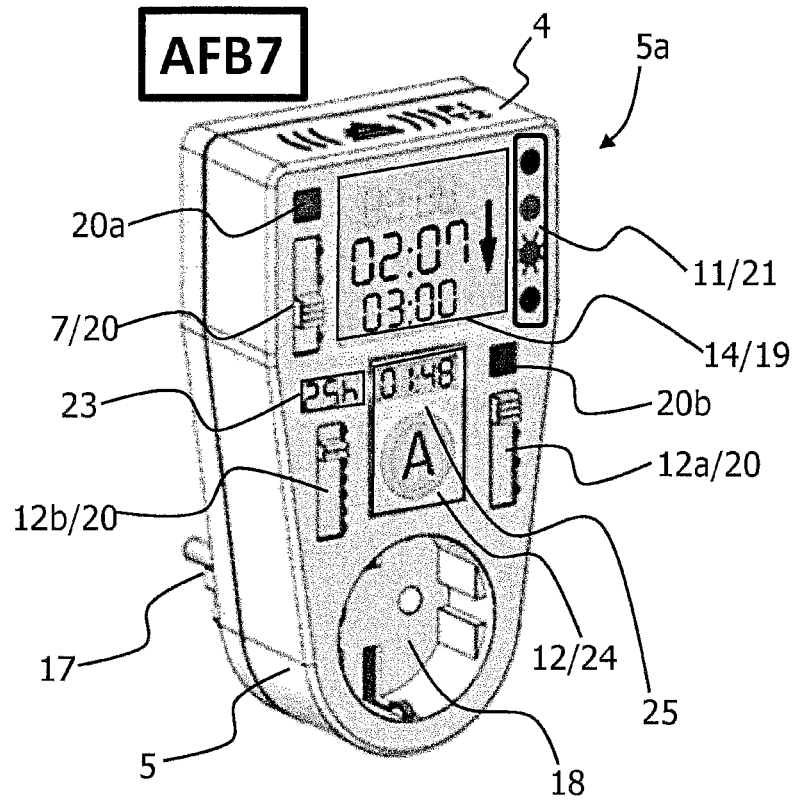
Figure 7:
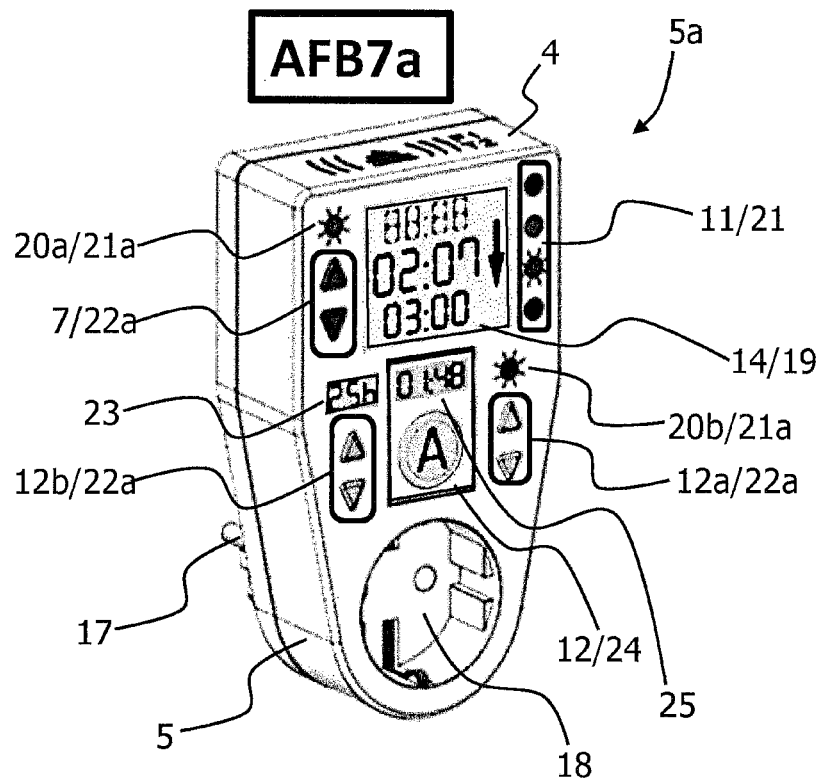
Figure 8:
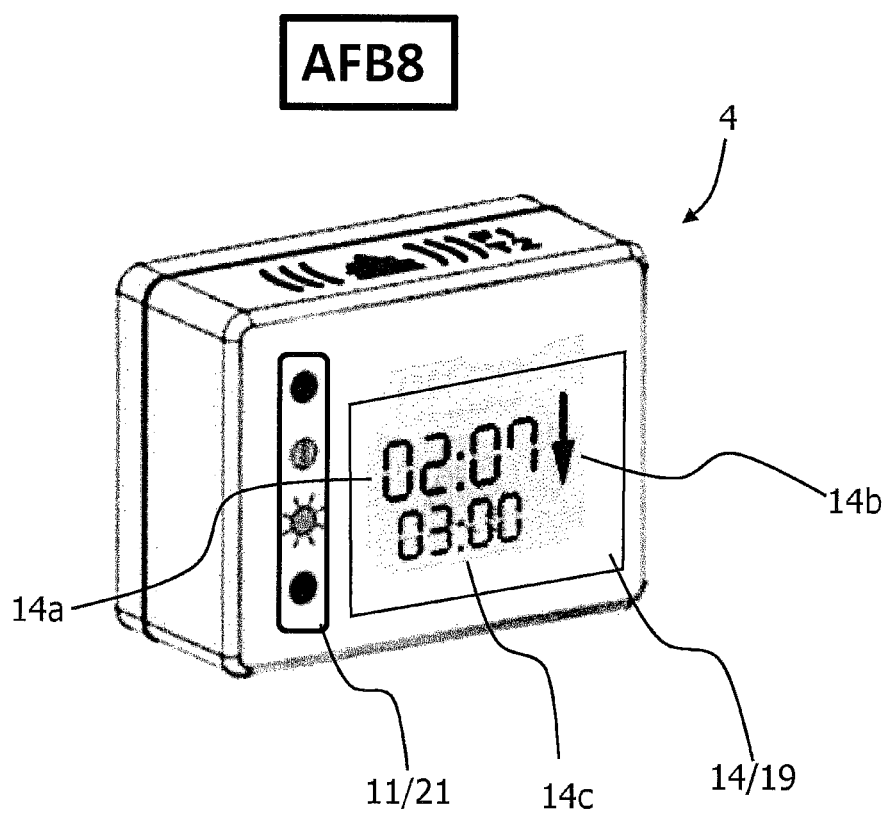
Figure 9:
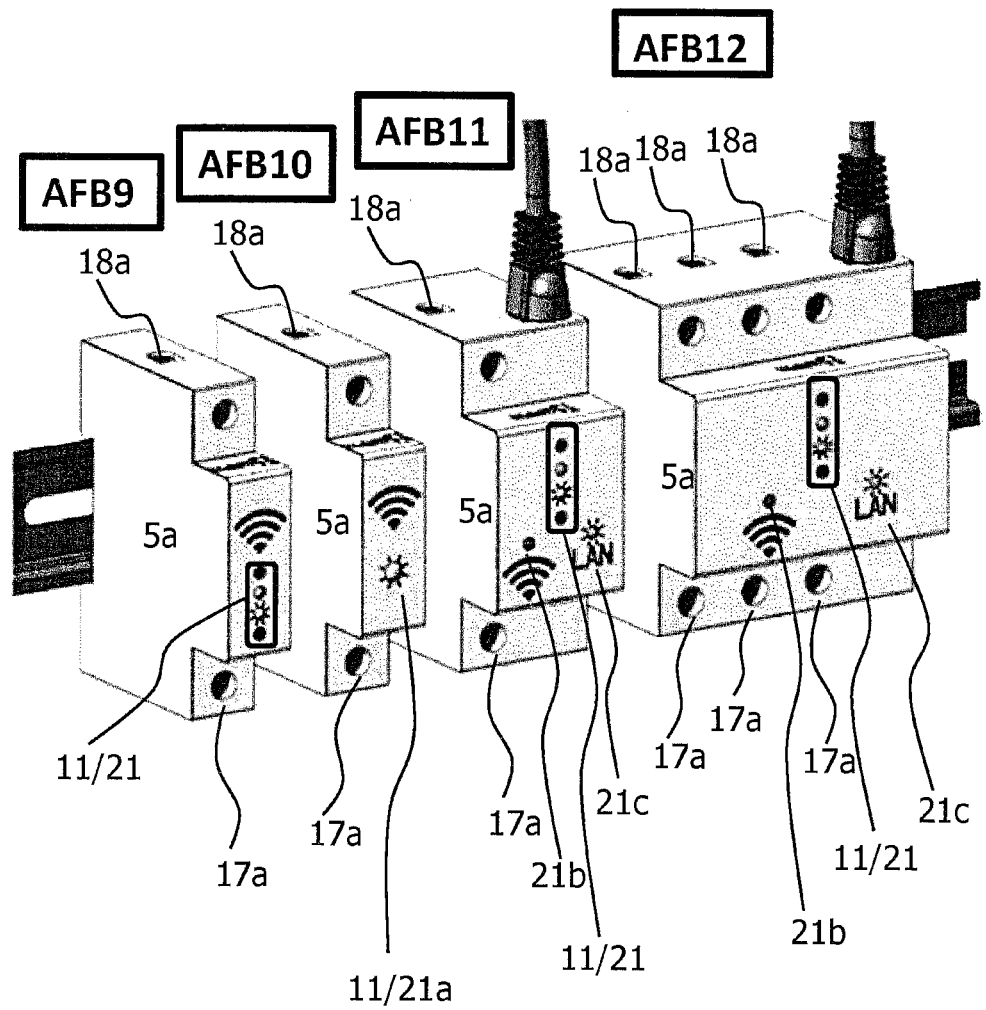
Figure 10:
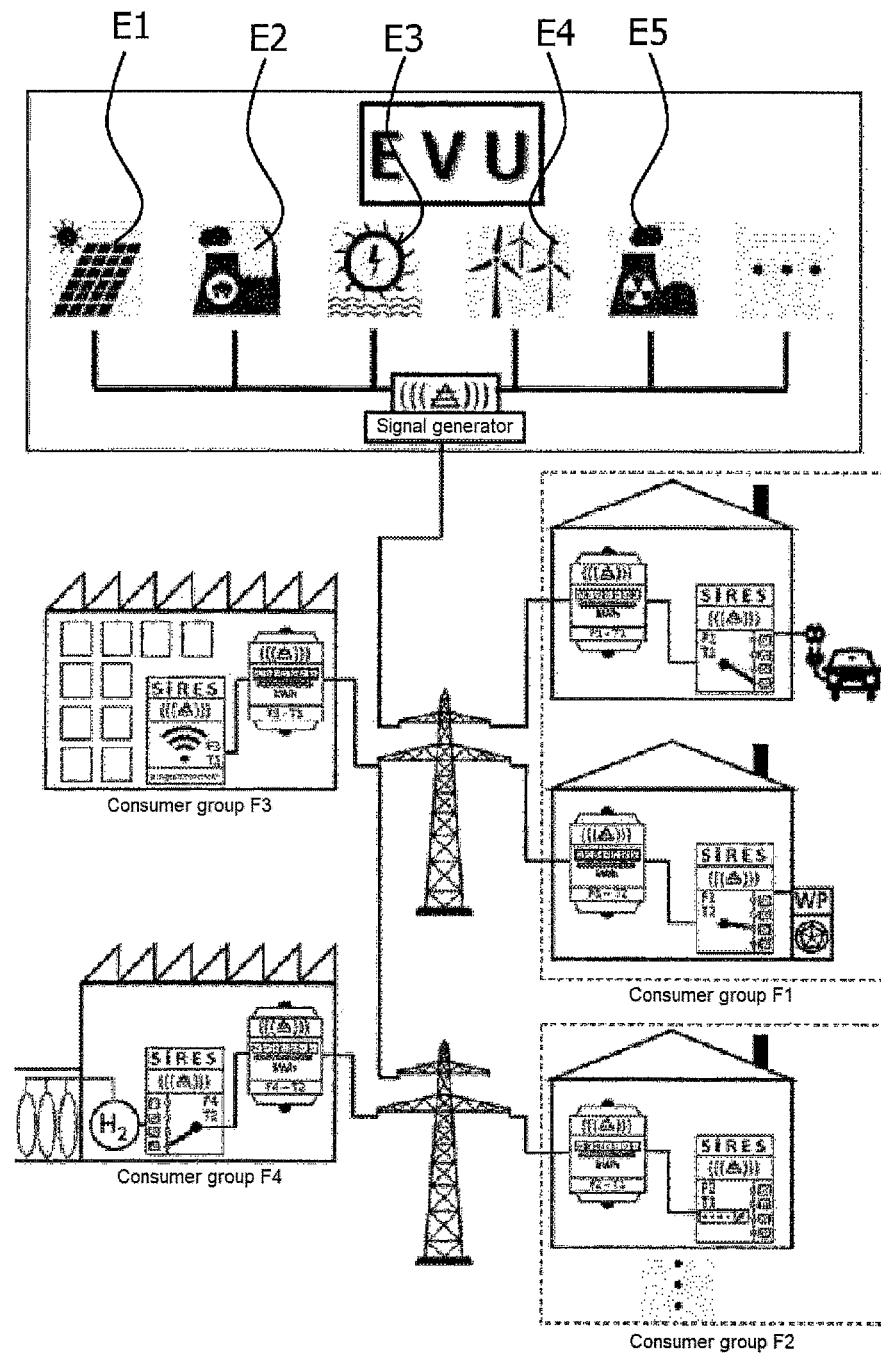

FIG. 1 shows an exemplary illustration of a power supply network with basic components for executing the method, FIG. 2 shows an exemplary illustration of a control signal and a receiving unit, FIG. 2a shows an exemplary illustration of possible signal transmissions and signal processings, FIG. 3 shows two exemplary embodiments of a receiving unit and a power output unit in a consumption control device, FIG. 3a shows a third exemplary embodiment of a receiving unit and a power output unit in a consumption control unit, FIG. 4 shows two further exemplary embodiments of a receiving device and a power output unit in a consumption control device, with an extended range of functions, FIG. 5 shows two further exemplary embodiments of a receiving device and a power output unit in a consumption control device with alternative pre-selection control, FIG. 6 shows a sixth exemplary embodiment of a receiving device and a power output unit in a consumption control device, with an extended range of functions, FIG. 7 shows two further exemplary embodiments of a receiving device and a power output unit in a consumption control unit, with an extended range of functions and an alternative layout/implementation of the pre-selection elements, FIG. 8 shows an eighth exemplary embodiment as a pure receiving and display device without a power output unit, FIG. 9 shows four further exemplary embodiments of a receiving device and a power output unit/input unit in a consumption control device/input control device, FIG. 10 shows an exemplary illustration of a power supply network and layout options of connected consumers/consumer groups.

FIG. 1 shows an exemplary illustration of a power supply network with basic components for executing the method. The power supply network includes at least one power supplier 1, which is responsible for tariffing the currently existing energy on offer with a power tariff. The power source in the present example is initially uncertain. In practice both regenerative and fossil primary power sources can be used.

In the vicinity of the power supplier 1 there is a signal station 2, which transmits a control signal 3 into the power supply network. The information contained in the control signal 3 is thus made available via the power supply network. A possibility here is for example an amplitude or frequency modulation of the alternating voltage present in the power supply network. Apart from the tariffs set by the utility company the control signal also includes additional information, which can be utilised for control in the receiving device and/or used by means of data processing integrated in the receiving device and/or arranged downstream.

A multitude of consumers and generators exists in the power supply network. With the method according to the invention the control signal transmitted over the power supply network is received at the respective locations of the consumers/generators and used for control. To this end receiving units 4 are provided at the locations of the consumers/generators, which receive the control signal 3 from the power supply network. The control signal then forms the basis for the operation control of power output units/power input units 5, via which connected power consumers/power generators 6 draw the power from/feed the power into the power supply network.

In the simplest case the power output units/power input units 5 are socket devices, into which the customary power plugs can be inserted. The socket devices can, however, be selectively switched and to this end comprise appropriate pre-selection/control devices, which realise switching states by way of the information in the control signal. These pre-selection/control devices are for example influenced by switches, timers, operation control programs for activating and deactivating the socket devices and for interrupting or establishing the connection with the power supply network. To this end it is advantageous, if the power output units/power input units 5 and the receiving units 4 are united in a common consumption/input control device. In the following a number of exemplary embodiments will be described to this end.

Each receiving unit 4 comprises customary components for receiving the control signal, which together with the setting of the pre-selection switching unit generate respective switching states. In the simplest case this requires neither a processor nor a storage unit and a numerical program. Optionally multiple parameter-controlled digital data processing can also be used for controlling the pre-selection switching unit.

To this effect FIG. 3 shows examples for a simple design and for structures of a receiving unit 4 and a power output unit 5, combined in a consumption/input control device 5a. A slide switch 20 here acts directly as a pre-selection switching unit 7 and controls switching states of the power output unit on the basis of the tariff information 3. As a result the switching states of the power output unit become a tariff switching state, i.e. the tariff information 8 set by the power utility company and currently present in the power supply network directly controls the power output from the power supply network to the downstream and connected consumers as a control variable. Furthermore an output of the current switching state is visualised via the LED 11a.

Advantageous further arrangements of the basic principle are given in exemplary embodiments AFB3 to AFB 10.

Each receiving unit 4 may in addition also include several operation control programs, each of which, in their own characteristic manner, control the respective pre-selection switching unit 7 and thus the power release. The user can choose between these programs, he can also set his own parameters and can, as the case may be, also edit the operation control programs.

FIG. 2 show an exemplary illustration of a control signal and a receiving unit, FIG. 2a additionally shows an exemplary illustration of possible signal transfers and signal processings. The signal transfers shown as dashed lines and the components may be advantageously present, but they are not mandatory for the inventive method as such.

As can be seen in FIGS. 2 and 2a the control signal 3 contains, in one advantageous arrangement, tariff change information 14 (divided into 14a, 14b, 14c, 14c1, 14c2 . . . ). These inform, among others, on the remaining time until the end of a currently existing tariff 14a and thus announce the change-over to a new tariff. Also included is the direction of change to the subsequent tariff 14b as well as the duration of the subsequent tariff 14c. Thus for example a switch position of the pre-selection switching unit can be changed and/or control parameters in the operation control program can be set anew. Also contained are the probabilities for the subsequent tariff and the further subsequent tariffs: probability of occurrence 14c1 as well as probability duration of the subsequent tariff 14c2 (and correspondingly: 14d, 14d1, 14d2 . . . etc.).

The control signal 3 further contains an example for source information 15. This supplies for example information about the power provider or the primary power source of the fed-in electrical energy. The source information makes it possible for example to assign different consumers to different primary power sources, insofar as respective options are set in the operation control program.

The control signal 3 further contains a transmitting ID 9. The transmitting ID 9 makes it possible to selectively control individual receiving units 4 and/or groups of receiving units.

Furthermore a feed control and follow-up control 12 and 12a can be set manually in the receiving unit 4 and/or integrated into the operation control program 16.

The feed control and follow-up control may for example control the power output unit in case of a tariff change, i.e. at the end of a tariff interval and during the change-over to a new tariff interval.

Furthermore the control signal 3 may contain a switching delay portion 10a. However, preferably the switching delay portion 10 is to be held in the receiving unit. For this, apart from groups of transmission IDs 9, receiving device groups with switch-on delay can be specified by the power utility company, so that tariff signal complexity is reduced. As a result it is relatively easy to obtain a chronologically staggered response from the power output units/power input units, so that switching load fluctuations in the power supply network can be spread out over larger periods of time.

Device-wise the receiving units 4 and/or groups of receiving units 4 are provided with a receiving ID 9a, which can be directly addressed by the transmitting ID 9 from the control signal 3. This receiving ID 9a of the devices may for example point to a user, to regional locations or to user groups. This allows individual areas of the power supply network or even some users of the power supply network to be selectively controlled.

In the following a number of exemplary embodiments for receiving units and power output units/power input units will be discussed. These are shown in FIGS. 3 to 7 as "intelligent sockets"/"intelligent socket strips". In the embodiments AFB1 to AFB7 the receiving unit and the power output unit are all integrated in a consumption control device 5a, which in an advantageous design can be inserted into an existing socket and into which in turn the customary plugs for electrical devices can be inserted. The embodiment AFB 8 is purely just a receiving unit with information output via a display without power output unit/power input unit. In the embodiments 9 to 12 the receiving unit and the power output unit/power input unit are integrated in a consumption control device 5a.

This is illustrated in FIG. 3, which shows a first embodiment AFB1, a second embodiment AFB1a.

Embodiments AFB1 to AFB7 comprise a plug portion 17 and can thus be inserted into a customary socket. The power output unit 5 in both embodiments is itself provided with socket portions 18. The customary plugs of consumers can be inserted here.

The receiving unit 4 comprises a slide switch 20 in the embodiment AFB1, which directly represents the pre-selection switching unit 7. Above the slide switch is a display 20a coupled to the switch, which depending on the switch position also additionally displays the pre-selection switch setting by way of colour information. The user therefore ideally chooses between differently colour-coded pre-selection options thus allowing him to make his choice intuitively. A number of LEDs 21 is provided for signalling the power tariff currently in force. These LEDs in particular comprise different colours, thus allowing the user to quickly recognise the currently present tariff. Furthermore, an LED for signalling the switching state is arranged to the left of the socket, i.e. an indication as to whether power is present.

Embodiment AFB1a in FIG. 3 offers a variant to embodiment AFB1 but with a socket strip. Furthermore the colour display of the pre-selected tariff switching release 20a is arranged, not above but to the left next to the pre-selection switch 7.

In embodiment AFB3 the slide switch 20 in AFB1, or AFB1a has merely been replaced by a rotary switch 22 due to a different haptic. It is possible to intuitively perform pre-selection via position, stop right/stop left. In addition, for example, the colours red, yellow, green and blue with corresponding counter-marking can point to different pre-selection settings. The meaning of the LEDs is the same as in embodiments AFB1/ABF1a.

In the embodiment AFB4 and AFB4a shown in FIG. 4 the receiving unit 4 comprises a display 19, which displays tariff change information 14 (14a, 14b, 14c) to a user. The remaining functions correspond to the functions analogue AFB1.

In the embodiments AFB5 and AFB5a shown in FIG. 5 a pre-selection switching unit as in embodiment AFB1 is provided, but here the pre-selection switching unit on the device cannot be set by hand. The corresponding slide switches have therefore been omitted. Setting is instead effected via an external communication device—here specifically Bluetooth for AFB5 and W-LAN or similar for AFB5a.

Embodiment AFB6 in FIG. 6 comprises a slide switch with associated time display 23, via which for example the minimum tariff duration for switching release can be set. Further, the slide switch on the right can be used for setting a follow-up time. The row of slide switches 20 thus allows a differentiated pre-selection of switching conditions. The LED row 21 as well as the display 19 have the same functions as in embodiments AFB1/AFB4.

In the embodiments AFB7/AFB7a shown in FIG. 7 the functions are analogous compared to those of embodiment AFB6, but the positional arrangement is different. Furthermore compared to AFB6 provision is made for a starter button/feed control/current release button 12/24 for program selection. The remaining components correspond to the embodiments previously discussed.

The embodiments AFB9 to ABF12 shown in FIG. 9 are designed as hat rail modules for installation in sub-distribution units, i.e. in particular in fuse boxes. Depending on the design, the receiving unit and the power output unit or the receiving unit and the power input unit are integrated in a consumption control device 5a. All pre-selection settings are executed via a communication interface. Here AFB12 represents a consumption/input control device for a 3-phase connection to the power supply network.

These basic configurations can be used in a variety of ways, wherein the basic components 4 and 5 are combined to form an outwardly coherent consumption/input control device 5a.

AFB8 in FIG. 8 is a special case. Here only the receiving unit 4 is present with indication of the current tariff information 11 via LEDs 21 and tariff change information. The display unit shows the remaining duration of the current tariff 14a, the direction of change to the subsequent tariff 14b and the duration of the subsequent tariff 14c. The power output unit 5 has been altogether omitted in this embodiment. This device is intended merely for assistance in planning and executing of energy-intensive actions.

Possible uses of the method as well as possible operating functions of the consumption control units shall now be described in more detail with reference to the previously described exemplary embodiments AFB1 to AFB7.

It is insightful that exactly then when a lot of power is available consumers have to be persuaded to use the power in exactly these time periods and in return not to use it in times when supply is scarce. The current power supply situation is described by way of different current prices/tariffs.

With the consumption/input control devices 5a according to embodiments AFB1 to AFB12 and for help with grasping the tariff issue in terms of ease of consumer understanding the tariff information of the control signal is explained by way of colour categories. Advantageously this is done by way of known patterns, as for example a traffic light. The colour red means "currently very scarce=expensive, the colour yellow means "normal tariff", the colour green "favourable tariff", the colour blue "very favourable tariff". The number of colour categories and colour allocations are of course deliberate and can be modified at random. The display of this may e.g. be effected by means of rows of LEDs, which are preferably arranged in the manner of a traffic light, red-at-the-top="expensive", below that is yellow, below that green, at the bottom=blue=very favourable.

Other options are, of course, also multi-colour LEDs, coloured display background illuminations or monochrome colour designations, acronyms or other equivalent visualising representations.

At the end consumer a power measuring device (electric meter) is installed with a fixed receiving ID matched to the receiving unit, in order to be able to record the power consumption at the different tariffs. As described an essential component of the method and the device is the receiving unit, which is adapted to suit the receiving ID of the electric meter. The receiving unit is either a universal unit, which can be configured in a multitude of ways to suit the electric meter ID, or a unit with a fixed matching receiving ID.

For the targeted use of certain tariff states it is possible, with the embodiments shown here, to set a desired tariff switching state by means of pre-selection, such as a slide switch or rotary switch or Bluetooth/W-LAN or other means of influence. If for example "green" is set, the device will only switch to "pass" for a control signal, which corresponds to the switching state "green" or "blue". For a "yellow" setting there is a pass for "yellow"", "green" and "blue". If the setting is "blue", a pass is possible only for "blue". With a "red" setting there is always a pass at the power output unit.

Possible embodiments are practically limitless, as the above examples indicate. Arrangements may for example be in form of an adapter, a hat-rail-system module, an UP socket module, an AP module, or also merely just a display module without a switch function or a switch function capable of coupling. Further designs and layouts are readily conceivable in terms of expert action.

Furthermore a possible part of the invention is tariff change information communicated by the power utility company, which includes a countdown to the next switching state with additionally the sign, into which direction the next switching action will go, such as with the embodiment AFB4. Here it is possible, with one glance at the device, to manually/mentally plan certain energy-intensive measures in the household. For example taking the device from AFB6, this will show that the price for current is going to fall in 2 hours and 7 minutes. This may mean for the user for example that he can then vacuum-clean, dry his hair, bake a pizza, make popcorn or something like that, which however just at the moment should rather be avoided, because this will be cheaper at a later time. Furthermore this tariff change information can be used as a basis for the "smart" calculation of internal or even external program sequences of downstream equipment or consumers.

A further possible design is the transfer, with the control signal, of probability factors of the tariff switching states to be expected and their duration. For example, a directly following tariff may be assigned a probability of 100%, its duration a probability of 100%, with later switching states being assigned a lower percentage or a corresponding predictable stability of expected wind and sun states. These probability factors can also be used as a calculation basis for downstream smart devices for calculating the most effective operation modes. It might for example be possible to pre-set further tariff calculation strategies on a speculative basis.

A further particular and essential design feature and field of application of the method and the device is its use in the problem area of switching load distribution. In this case the control signal carries an ID of different consumer groups, for example in the form of a numeric code F1 to Fxxx in combination with a switching delay T1 to Tyyy. An example for this is shown in FIG. 10. There consumer groups F1 to F4 are shown. Due to an almost infinite combination of IDs necessary time-shifted switching operations can be realised, which impact the network in a gentle but not abrupt manner. Thus the power supply network operators are able to react very quickly and flexibly to load fluctuations.

The first part of the ID (Fxxx) may perhaps be transferred by different frequencies or by different signal parameters on one frequency. The switch-on duration with different IDs may be, but must not be the same. It is thus possible to not only form consumer groups, but to realise individual switch-on durations, depending on the type of consumer, in particular distinguishing between private household and industry. The IDs for different consumer types may e.g. be delimited by means of certain ID areas. For example, an ID beginning with F1xx may be assigned to private households and an ID beginning with F4xx may be assigned to high-consumption industry sectors.

Further the tariffs may be assigned certain minimum time periods or maximum time periods, which also can be transferred via the control signal. A green tariff for example may last at least 3 hours (so that e.g. a washing machine program can complete its cycle) or e.g. a red tariff maximum 1 hour, thereafter at least 1 hour yellow (e.g. for switched-off cooling and freezing devices . . . ). This could also be realised by a pre-set in the receiving device, i.e. for how long a device in red mode may be off/coupled with a temperature (e.g. fridge) or a storage load control (e.g. for a heat pump, batteries etc.)

It is also possible for the user to pre-set, on the receiving unit, an additional switching parameter, a minimum duration of a tariff block as a condition for the switch-on. This is for example possible in the example AFB6 by means of the central slide switch.

In addition it is possible for devices switched-on in retrospect to determine a minimum duration at a favourable tariff for switch-on (fixed switch-on tariff) and then determine a more expensive tariff for further operation. This could e.g. in the embodiment AFB6 be set via the right-hand slide switch.

Furthermore a so-called "starter button" could be provided in the device, so that a pre-switch-on for certain follow-on devices is possible. This is for example the case with a washing machine, for as a rule, this continues operating after power is returned at the point, where it had stopped—however the program must have been started previously. At any rate, it would not start operating if the program had not been "pre-started" and merely receives power. This is where a "starter" button is useful. By pushing it, one can, for a short switching duration independent of a tariff pre-selection, release the power flow with a countdown. This could, for example, be realised in embodiments AFB7 and AFB7a according to FIG. 7 by the power release buttons 24 shown there. Their operation could, for example, be such that for a single press for 30 seconds the power is released and for each further press for a further 30 seconds, or with another embodiment with respective doubling of the previous value.

Switch-off could e.g. be effected by a one-time long press. In the embodiments AFB7 and AFB7a the power release buttons 24 have their own power release display 25 assigned to them for indicating the respectively set time intervals. Further embodiments can be readily realised here in terms of expert action.

FIG. 10 shows an exemplary power supply network. In the embodiment shown here several consumers are combined to form different consumer groups F1 to F4, so that several consumers comprise an identical ID. These can be specifically targeted with a control signal addressed to individual groups F1 to F4, so that these can be connected into the network or disconnected therefrom in a staggered manner.

In addition, as with the consumer, certain generators E1 to E5 can be connected into the power network. It is e.g. inefficient to generate biogas power in periods of a surplus of solar power and wind power—here the gas could be stored and better fed into the network in periods, when power is scarce (i.e. during "red" and "yellow" tariff phases), but in return with more generators. Further examples applicable in this context are the connecting-in of block thermal power stations, battery buffer stations and similar generators. By making use of the price-tariff variance on the generator side, there is room for a certain amount of compensation of the dynamics of generation/feed-in.

Moreover the signal can be used to carry information on the source of the power and for this information to be indicated by downstream equipment. Furthermore it would be possible to add/implement a method and a device downstream, which takes further power sources (e.g. local solar power generation) into account in the control of the connected devices thus determining the most effective operating modes and thereby the most cost-effective state of operation.

In addition there exists the possibility of checking for misuse at the meter. The sum of tariff times transmitted via the control signal must match the consumer meter times. To this end a sum is formed at the meter, which is the sum of switched tariff times with determined correction factors.

The method according to the invention—with respect to power supply—may form the basis for establishing a smart power management in the end user area or be combined therewith. This offers advantages for the power supply right up to the meter: data protection, supply stability, protection against external intervention/manipulation with simultaneous possible price control and above all effective use of the dynamics of regenerative current combined with stabilisation of the power grid load profile.

For a maximally efficient low tariff energy use so-called "smart" devices at the end consumer could for example receive a tariff forecast (similar to a weather forecast) via the control signal and/or the internet and calculate the most favourable program sequences on the basis of the tariff forecast. The invention has the advantage that it switches independently of the "smart" devices thereby ensuring security (comparable to galvanic separation/optical couplers in electronics).

A further advantage exists in that for an appropriate design of the consumption control device—with integrated operation control program—any existing consumer can be converted into a smart device by arranging such a consumption control device upstream. In case of demand this offers the possibility of integration/interlinking in so-called smart home systems.

The design of the consumption control device can be chosen depending on personal preference, from a purely analogue design to an operation-program-controlled design. Using the invention existing devices can be operated in an ecological and energy efficient manner without having to rely on smart devices, but an integration of the properties of smart devices is also a useful possibility.

The invention offers the possibility to realise in a very simple manner a stable, economically efficient and secure as well as low-price power supply control with regenerative energies.

The method according to the invention has been discussed with reference to exemplary embodiments. In terms of expert action further designs are possible. These are, at any rate, revealed in the sub-claims.

LIST OF REFERENCE SYMBOLS

1 power utility company (EVU)
2 signal station
3 control signal
4 receiving unit
5 power output unit/power input unit
5a consumption/input control device
6 power consumer/power generator
7 pre-selection switching unit
8 item of tariff information in the control signal
9 transmitting ID
9a receiving ID
10 switching delay fixed in receiving device
10a switching delay portion variable in control signal
11 tariff information output e.g. in data form, presentation/display of current tariff or similar . . . .
11a display of the switching state of 5
12 feed control
12a follow-up control
12b additional control parameter (e.g. condition minimum tariff duration for switching release)
13 communication interface (e.g. Bluetooth, WLAN, LAN . . . )
14 tariff change information
14a remaining duration of current tariff
14b direction of change of subsequent tariff
14c duration of subsequent tariff
14c1 probability of onset of subsequent tariff
14c2 probability of length of subsequent tariff
15 source information
15a information about local power generation (quantity, proportion in relation to energy consumption)
16 operation control program
17 plug portion
17a connecting terminal to grid
18 socket portion
18a connecting terminal to consumer/generator 19 display
20 slide switch
20a indication of pre-selected tariff switching release
20b indication of pre-selected follow-up control
21 LED (row)
21a multi-colour LED
21b status LED W-LAN
21c status LED LAN
22 rotary switch
22a push button
23 time display
24 current release button/starter button
25 current release display

The invention claimed is:

1. A method for power consumption and power input control in an electrical power supply network, the method comprising the steps of:
generating a control signal (3) with at least one item of tariff information (8) as well as with ancillary information (14)(15) by a signal station (2) at a power supplier (1) and unidirectionally outputting the control signal (3) via the power supply network;
receiving the control signal (3) by at least one receiving unit (4) arranged in the power consumption network, wherein the control signal (3) received by the receiving unit (4) is used for operation control of a power output unit/power input unit (5) for downstream power consumers/power generators (6), and wherein the control signal (3) does not possess any switching authorisation;
executing a switching release of tariff states by the receiving unit (4) via at least one pre-selection switching unit (7) in dependence of the tariff information (8) contained in the control signal (3);
generating by the receiving unit switching states in dependence of the tariff information (8) of the control signal (3), wherein it can be predefined by a user, in which way the control signal (3) can be used at the location of the power consumption/power input for operation control, or wherein the receiving unit (4) instead of the pre-selection switching unit (7) can comprise freely selectable and/or editable operation control programs (16) for processing the control signal (3); and
executing a user-specific selection at the receiving unit (4) under predetermined switching states/switching characteristics of the power output/power input unit;
wherein the ancillary information includes source information (15) that points to a power supplier and/or a primary power source and/or information about a local power generator (15a), and wherein settings of the pre-selection switching unit (7) can be executed manually or via the operation control program (16) in dependence of the source information.

2. The method according to claim 1, characterised in that the receiving unit (4) comprises a stored receiving ID (9a), wherein the control signal (3) is addressed by means of a transmitting ID (9) to the receiving ID (9a) of a receiving device (4) and/or a group of receiving devices (4) with identical receiving ID (9a).

3. The method according to claim 1, characterised in that a tariff information output (11) of the current items of tariff information (8) of the control signal (3) is executed by the receiving unit (4) and/or by an external communication device.

4. The method according to claim 1, characterised in that the switching release of tariff states can be executed by the receiving unit (4) via the at least one pre-selection switching unit (7) in dependence of the items of tariff information (8) contained in the control signal (3).

5. The method according to claim 1, characterised in that the receiving unit (4) comprises one or more freely pre-selectable operation control programs (16), wherein a user-specific selection can be executed under predetermined editable switching options of the power output/power input unit (5).

6. The method according to claim 1, characterised in that the items of tariff information (8) and the ancillary information (14)(15) are visualised via a display and a setting of the pre-selection switching unit (7) is effected manually and/or the pre-selection switching unit (7) is controlled via the operation control program (16), wherein an appropriate control of the power output/power input unit (5) is executed in accordance with the setting of the pre-selection switching unit (7) by means of the control signal (8).

7. The method according to claim 1, characterised in that a switching load distribution is executed in the power supply network by the control signal (3), wherein the control signal (3) contains a combination of the items of tariff information (8), the ancillary information (14)(15) and a transmitting ID (9), wherein individual or several receiving devices and/or user units can be selectively controlled by the transmitting ID (9).

8. The method according to claim 7, wherein the user units include one or more of household units and industrial units.

9. The method according to claim 1, characterised in that the control signal and/or the receiving device comprises a switching delay portion, wherein a chronologically staggered response of individual power output units and/or power input units (5) can be executed by means of the switching delay portion (10).

10. The method according to claim 1, characterised in that the ancillary information includes tariff change information (14), wherein the tariff change information (14) can cause a future switching state of the pre-selection switching unit (7) to be influenced manually or via the operation control program.

11. The method according to claim 1, characterised in that the receiving unit (4) comprises a manually activated and/or programmable feed control (12) and/or a follow-up control (12a) and/or a definable minimum tariff duration for a switching release (12b), wherein a correspondingly adapted switch-on procedure and/or switch-off procedure can be pre-selected and/or executed at the power output unit and/or the power input unit (5).

12. The method according to claim 1, characterised in that the receiving unit (4) executes a signal transfer with an external stationary and/or mobile communication terminal, wherein the communication terminal can cause a control and/or function capture of the receiving unit (4) and/or of the power output unit and/or power input unit (5) to be executed by means of influencing the pre-selection switching unit (7) and/or the operation control program (16).

13. A device for power consumption/power input control, containing a receiving unit (4) for a control signal (3) unidirectionally communicated via an energy supply network with a transducer of the control signal (3) for generating switching operations for a power output/power input unit (5) controlled by the receiving unit (4) for connecting a downstream consumer and/or generator (6), wherein a switching release of tariff states can be executed in dependence of tariff information (8) contained in the control signal by the receiving unit via at least one pre-selection switching unit (7) and/or an operation control program (16) and the receiving unit is designed for generating switching states in dependence of the tariff information of the control signal, or wherein the receiving unit (4) instead of the pre-selection switching unit (7) comprises freely selectable and/or editable operation control programs for processing the control signal (3), wherein a user-specific selection can be executed under predetermined switching states/switching characteristics of the power output/power input unit, wherein the control signal (3) further contains source information (15) pointing to a power supplier and/or a primary power source and/or information about a local power generator (15*a*), and wherein settings of the pre-selection switching unit (7) can be executed manually or via the operation control program (16) in dependence of the source information.

14. The device according to claim 13, characterised in that the receiving unit (4) and the power output unit and/or the power input unit (5) are integrated in a common consumption/input control device (5*a*), wherein the consumption/input control device (5*a*) has a plug portion (17) for plugging the consumption/input control device (5*a*) into a socket connection.

15. The device according to claim 13, characterised in that the receiving unit (4) and the power output unit and/or the power input unit (5) are integrated in a common consumption/input control device (5*a*), wherein the consumption/input control device (5*a*) has at least one socket portion (18) for inserting a plug of a consumer to be connected.

16. The device according to claim 13, characterised in that the receiving unit (4) and/or the power output unit and/or the power input unit (5) and/or the consumption and/or input control device (5*a*) comprises a communication interface (13) for a data exchange with an external communication device, wherein the external communication device contains means for influencing the pre-selection switching unit (7) and/or the operation control program (16) in the receiving unit (4) and/or in the power output unit/power input unit (5) and/or in the consumption/input control device (5*a*).

17. The device according to claim 13, characterised in that the receiving unit (4) and/or the power output unit/power input unit (5) and/or the consumption/input control device (5*a*) comprises means for selecting, setting and/or displaying user control default settings.

18. The device according to claim 17, characterised in that the means for selecting, setting and/or displaying of user control default settings can be set up via an external communication device via the communication interface (13).

* * * * *